INVENTOR.
ROBERT CLARK JONES
BY George Sipkin
Lee J. Huntzberger
ATTORNEYS

INVENTOR.
ROBERT CLARK JONES
BY George Sipkin
Lee J. Huntzinger
ATTORNEYS

Nov. 24, 1970

R. C. JONES 3,543,028

HEMISPHERIC SEARCH DETECTORS FOR BODIES
EMITTING SPECTRUM RADIATION

Filed Jan. 29, 1958

INVENTOR.
ROBERT CLARK JONES
BY George Sipkin
Lee J. Hintzberger
ATTORNEYS

360 CPS. FORWARD ACTING COMPRESSING AMPLIFIER

INVENTOR.
ROBERT CLARK JONES

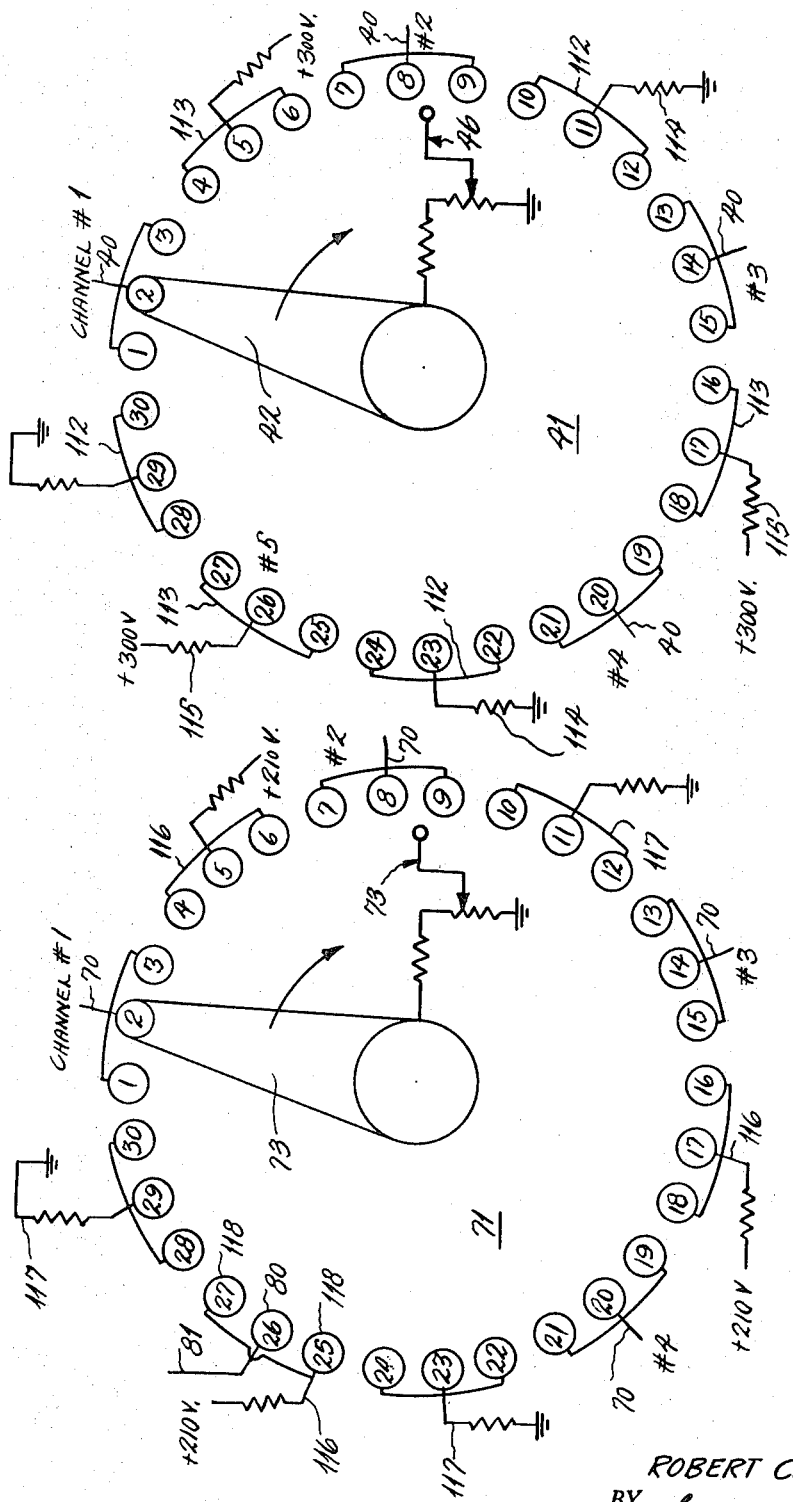

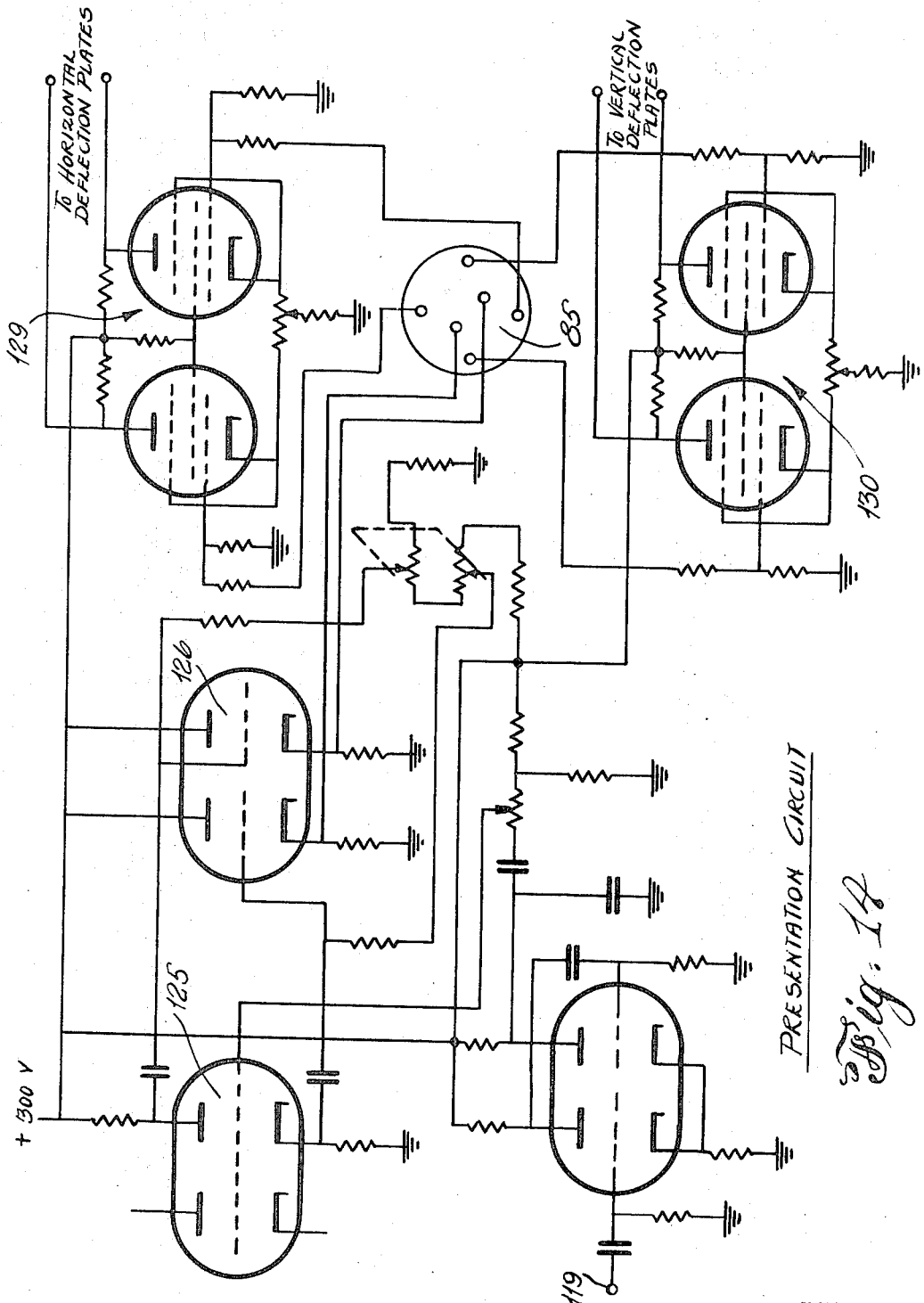

3,543,028
HEMISPHERIC SEARCH DETECTORS FOR BODIES EMITTING SPECTRUM RADIATION

Robert Clark Jones, Cambridge, Mass., assignor, by mesne assignments, to the United States of America as represented by the Secretary of the Navy
Filed Jan. 29, 1958, Ser. No. 712,051
Int. Cl. G01s 3/78
U.S. Cl. 250—83.3        18 Claims This invention relates to a hemispheric search detector for locating the position, at any time, of a body that emits spectrum radiation, particularly in the heat part of the spectrum. It is especially useful in scanning the sky to locate by azimuth and elevation an airborne body that emits heat radiation. Examples of such bodies, whose location it is desired to detect, are power operated planes and guided missiles, which have parts at temperatures that vary considerably. Information on infrared radiation from airborne targets such as power operated planes and guided missiles is fragmentary and incomplete. Radiation from the heat or infrared part of the spectrum includes power radiated over a rather broad range of wavelengths, but the wavelengths most useful in detectors lies between one and fifteen microns in most cases. Bolometers and photoconductive cells have been used separately in the detection of infrared radiation but these types of devices are the most sensitive and operate most satisfactorily on temperatures at the source which are in materially different ranges or wavelengths, and hence the use of one type of detector cell alone is inadequate because the temperature of the unknown source of spectrum radiation is seldom if ever known while the search is in progress.

Heretofore it has been proposed to employ for the detection of airborne objects that emit spectrum radiation, a sequential scanning system using a single detecting element that was moved to cover in succession each of the picture elements of the image, and also image tubes with which each picture element of the area to be covered is associated on a one-to-one basis with an element of the area of the detecting surface. Thus the sequential scanning system and the image tube represent two extreme possibilities.

An object of this invention is to provide a detector which will avoid these extreme possibilities, and require the operation only of a single device to locate the position of an object emitting spectrum radiation, and which may be successfully operated by persons of relatively moderate ability and skill.

Another object of this invention is to provide an improved hemispheric search detector which will be adequately sensitive for the location of bodies emitting spectrum radiation over an exceptionally wide range of wavelengths, which will enable the detection and location by azimuth and elevation of airborne objects emitting infrared radiation over a broad band of wavelengths and variations in temperatures of the source, which will be effective over objects at both long and short distances from the detector, with which the temperature of the part emitting the radiation need not be known, and which will be relatively simple, compact, practical, effective and inexpensive, and easily manipulated.

Other objects and advantages will be apparent from the following description of an embodiment of the invention, and the novel features thereof will be particularly pointed out hereinafter in connection with the appended claims.

In the accompanying drawings:

FIG. 12 is a diagram illustrating a switch with its circuit connections that may advantageously be employed in connection with the circuits from the different bolometer cells;

FIG. 13 is a similar diagram illustrating a switch with its circuit connections that may be advantageously employed in connection with the circuits from the different photoconductive cells;

FIG. 14 is a circuit diagram of one example of a presentation circuit that may advantageously be employed in the detector.

Figure 1:
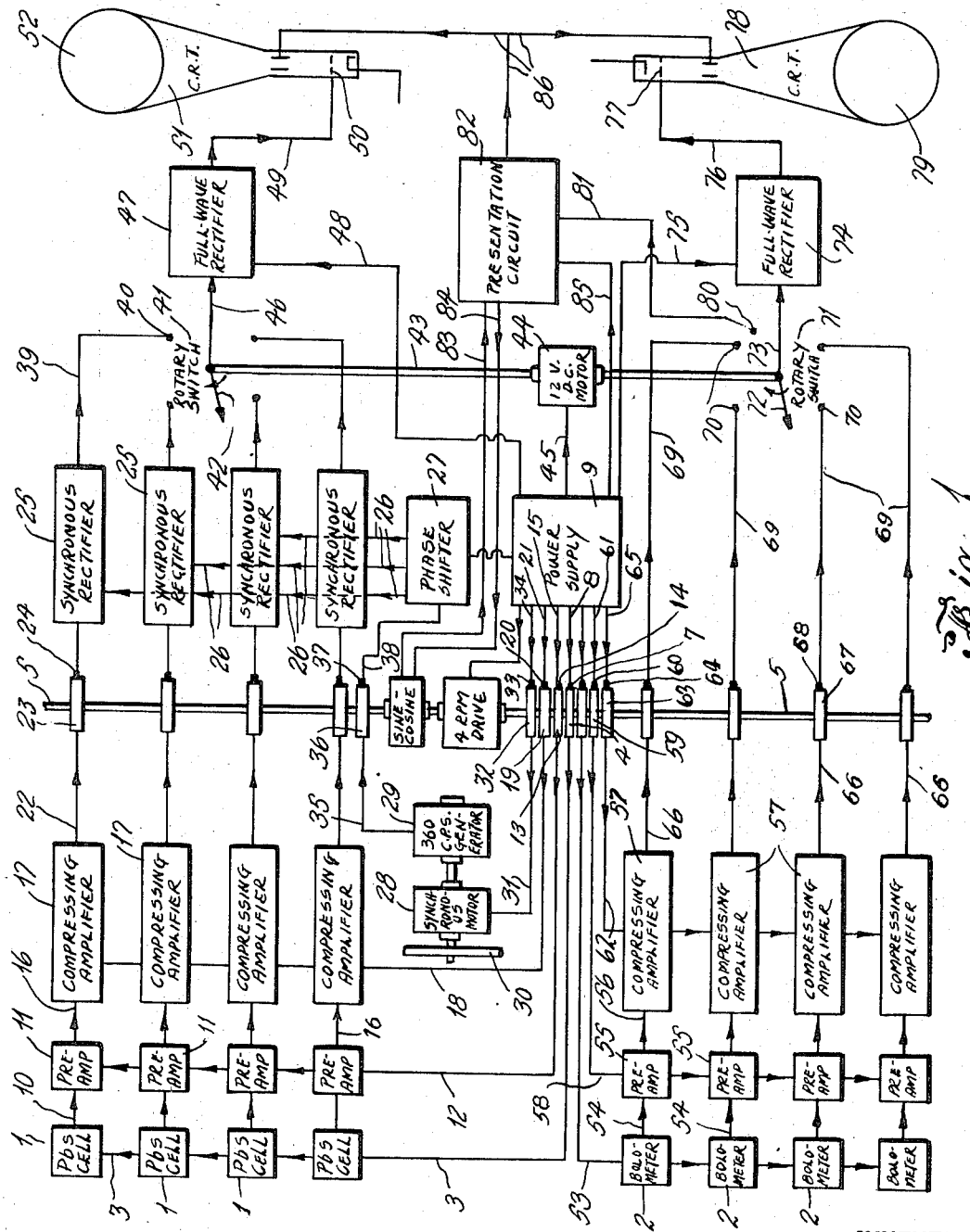
FIG. 1 is a schematic or block diagram illustrating the various parts of the detector and their relationship to one another.
Figure 2:
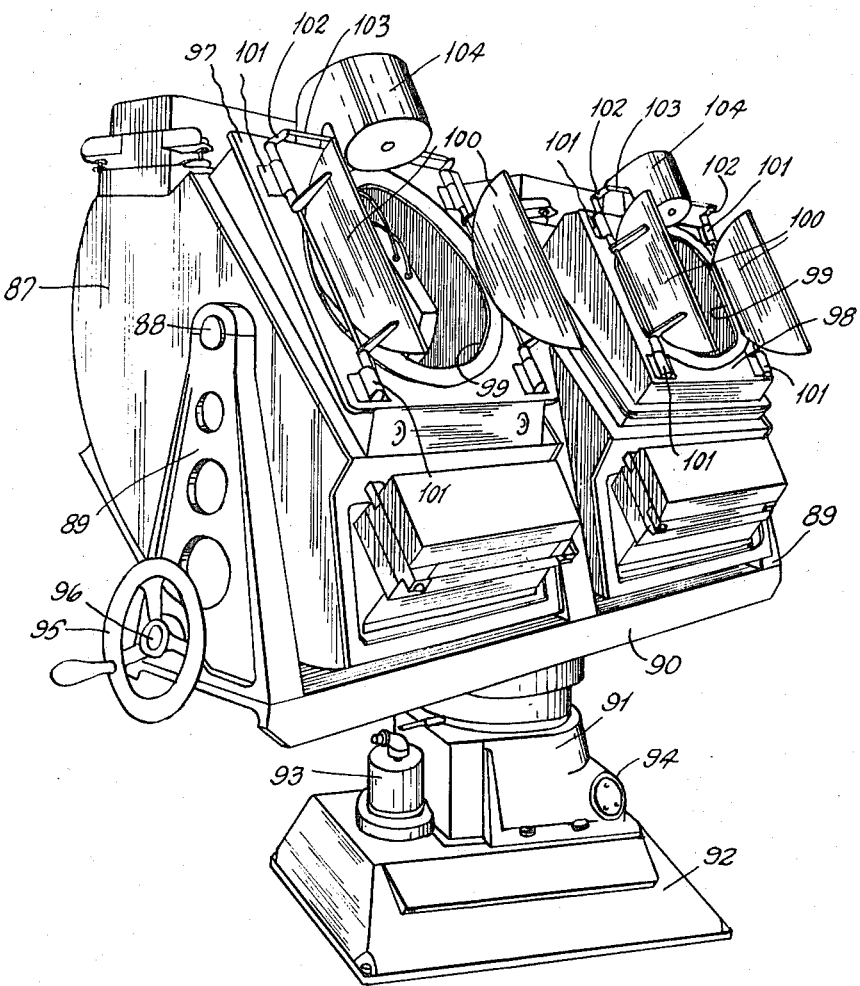
FIG. 2 is a perspective of a primary scanning device forming a part of the detector.

In the illustrated embodiment of the invention, reference is first made to the block or schematic diagram illustrated in FIG. 1 which identifies the various components of the detector and illustrates their relationship to one another. This general relationship will be first described and then the various components will be individually discussed. In this hemispheric detector two optical systems are mounted in a housing side by side for rotation about an upright axis, as illustrated in FIG. 2. Each optical system during this rotation about the upright axis receives spectrum radiation that is emitted from various distant sources, one of which may be an object such as an engine at a relatively high temperature that emits radiation in the lower part of the spectrum. Radiation from the same source is received in both of the optical systems at the same time, and each optical system, in a manner which will be explained later, individually focuses the incident radiation upon one of a plurality of cells located within the housing and arranged in an arcuate row. The particular cell on which the radiation is focused depends upon the angle that the radiation rays make with the horizontal and vertical in entering the optical system.

The cells 1 of one of the optical systems are of the photoconductive type, and the cells 2 of the other optical system are of the bolometer thermistor type. The cells of both types have their conductivity varied by the intensity of the radiation that is focused thereon. Various types of photoconductive cells are well known in the art, those employing lead sulphide being those most readily available, but cells made of lead selenide and lead telluride are also useful but are less readily available. In fact, the lead selenide cells operate more successfully than the lead sulphide cells. Cells of the bolometer thermistor type are also well known in the art, some being disclosed in U.S. Pats. No. 2,414,792 and No. 2,414,793. A particular construction of a bolometer cell which is useful for this purpose forms the subject matter of a separate application copending herewith, Ser. No. 691,115, filed Oct. 18, 1957.

Current is supplied to each of the photoconductive cells 1 by a common wire 3 which leads from a slip ring 4 rotating with the shaft 5 which rotatably supports the housing 6 (FIG. 2). A brush 7 bears continuously on the slip ring 4 and is connected by a wire 8 to a power supply source 9. The wire 3 is connected to each of the cells 1 to supply current thereto, and each of these cells is also connected by a wire 10 to a preamplifier 11 which also rotates with the housing and which is located closely adjacent to the cells 1 so as to raise the level of the signals and reduce their impedance level, whereby the remaining amplification may be carried out at one or more feet away from the detector cells. Each of the preamplifier units 11 is supplied with operating current by a common wire 12 which is connected to a slip ring 13 on shaft 5, and a brush 14 bearing on that slip ring is connected by a wire 15 to the power supply 9. Each preamplifier is connected by a wire 16 to an individual compressing amplifier 17 also rotatable with the housing and optical systems, and each of these compressing amplifiers is supplied with operating current by a common wire 18 which is connected to a slip ring 19 on shaft 5 also rotating with the housing and optical systems. A brush 20 bears on the slip ring 19 and is connected by a wire 21 to the power supply 9. Each compressing amplifier is connected at its output side through a wire 22 to a slip ring 23 on shaft 5 and a brush 24 bearing on ring 23 leads to an individual synchronous rectifier 25 which does not rotate with the housing. The synchronous rectifiers 25 in FIG. 1 are connected individually by wires 26 to a phase shifter 27.

A synchronous motor 28 and a 360 c.p.s. generator 29 are mounted on the housing to rotate with the optical systems, and the motor operates the generator 29 and also a chopper cylinder 30 associated with the optical system for the cells 1. The function of the cylinder 30 will be explained later herein. The motor 28 is supplied with operating current from the power source 9 through a wire 31, slip ring 32, brush 33 and wire 34. The generator 29 is connected by wire 35, slip ring 36 on shaft 5, brush 37 and wire 38 to the phase shifter 27 which does not rotate with the housing. Each synchronous rectifier 25 is connected by a wire 39 to an individual contact 40 of a switch 41, and a rotary switch arm 42 makes contact in succession and repetitively with the contacts 40. The arm 42 is mounted on a shaft 43 driven by a motor 44 that is supplied with operating current by a connection 45 to the power supply 9. The switch arm 42 is connected by wire 46 to a full wave rectifier 47 that is connected by wire 48 to the power supply 9. The full wave rectifier 47 is connected by wire 49 to the brightness modulation control 50 of a cathode ray tube 51 having a screen 52.

The bolometer cells 2 are supplied with electric current from the power supply 9 through a common wire 53, a slip ring on the shaft 5, a brush and a wire to the power supply similar to the connections from wire 3 to the power supply. Each bolometer cell 2 is connected by a wire 54 to an individual preamplifier 55, and each of the latter is connected by a wire 56 to an individual compressing amplifier 57. Each preamplifier is supplied with current by a common wire 58 that is connected through a slip ring 59 on shaft 5, brush 60 and wire 61 to the power supply 9. A wire 62 supplies power to each amplifier 57, and it is connected through slip ring 63 on shaft 5, brush 64 and wire 65 to the power supply 9. Each amplifier 57 is also connected at its output side by an individual wire 66, slip ring 67, brush 68 and wire 69 to an individual contact 70 on a rotary switch 71. The contact arm 72 of the switch 71 is mounted on the shaft 43 to rotate therewith in synchronism with the switch arm 42, and is connected by a wire 73 to a full wave rectifier 74 that receives power by wire 75 from the power supply 9. The rectifier 74 is connected at its output side by wire 76 to the brightness modulation control 77 of a cathode ray tube 78 having a screen 79. The contacts 40 of switch 41 and contacts 70 of switch 71 are arranged in spaced angular relation about the axis of rotation of the arms 42 and 73.

The switch 71 is also provided with an additional contact 80 disposed intermediate of two of the contacts 70, and this additional contact is connected by wire 81 to a presentation circuit 82 which positions the signal spot in both of the cathode ray tubes, which will be explained later herein. Also connected to the presentation circuit by wires 83 and 84 is a sine-cosine generator 85 which is mounted on the shafts 5 for operation therewith. The presentation circuit is supplied with power from the power supply 9 by wire 85, and it delivers its signals by connections 86 to the beam deflection means of both cathode ray tubes 51 and 78.

Referring next to FIG. 2 a suitable hemispheric detector is illustrated. It includes a housing 87 provided on its ends with aligned trunnions 88 by which it is rockably supported between two arms 89 of a yoke 90. The yoke 90 has a depending shaft that is rotatably supported in a pedestal 91 of a base 92. An azimuth indicator 93 is mounted on the base and operated by a gear (not shown) on the depending shaft of the yoke 90. A drive shaft in the part 94 of the pedestal is motor operated, and drives said gear on the depending shaft that also drives the azimuth indicator 93. A hand wheel 95 is fixed on a shaft 96 that is rotatably mounted in one of the yoke arms 89 and carries a pinion (not shown) that meshes with arcuate rack teeth (not shown) on the arcuate rear wall of the housing 87, by which the housing may be tilted on its trunnions to present its front face at different inclinations to the horizontal. This front face of the housing has two parallel flat plates 97 and 98 each of which has an aperture or pupil opening 99 through which radiation to be detected may enter the housing. Each pupil opening is part of an individual optical system that is contained within the housing. Each aperture 99 has 2 closure shutters 100 that are hinged on the front plate 97 or 98 by hinges 101, and crank arms 102 on the pivot pins of the hinges are connected by links 103 to an operating device, such as a solenoid, in a casing 104. The shutters are operated to close the apertures 99 if the radiation should be excessive, such as direct radiation from the sun.

Figure 3:
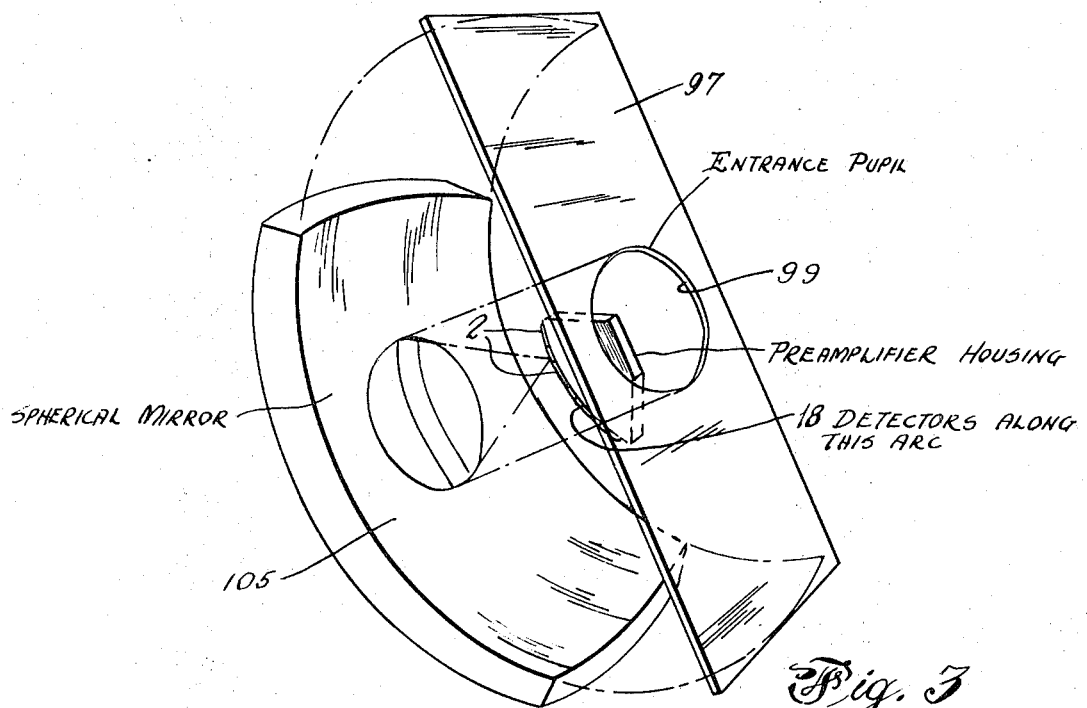
FIG. 3 is a diagram illustrating the principle of one optical system employed in the primary scannnig device.

Referring next to FIG. 3, the optical system in the housing 87 for the bolometer cells is indicated schematically. Disposed directly opposite the aperture 99 in plate 97 is a concave spherical mirror 105 which receives radiation entering the housing through the pupil or aperture 99 of that optical system and reflects it to a focus upon one of a plurality of the bolometer cells 2 that are arranged in an arcuate convex row between the aperture and the mirror, and concentric with the mirror in a plane containing the row and intersecting the mirror. The particular cell 2 of the row on which the radiation is focused at any time depends upon the particular inclination of the radiation which is so focused. The cells 2 are conveniently mounted on a convex, arcuate surface of a preamplifier housing 106 suitably supported in front of the mirror. The entering radiation passes through pupil opening 99 along the sides of the housing 106 to the mirror for reflection upon a cell 2.

Figure 4:
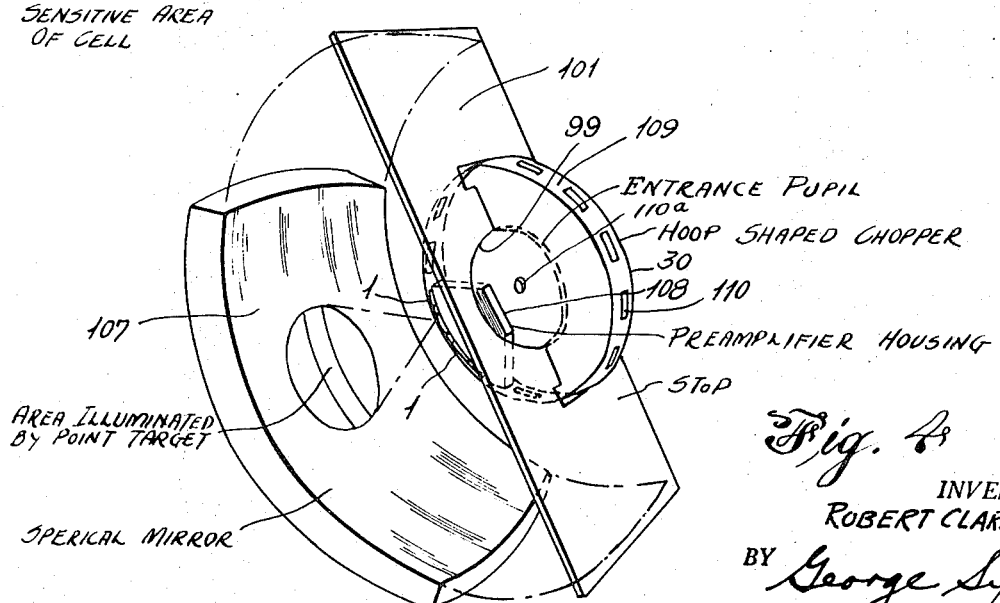
FIG. 4 is a similar diagram illustrating the principle of the other optical systems employed in the primary scanning device.

Referring next to FIG. 4, the other optical system in housing 87 for focusing radiation upon the photo-conductive cells 1 is schematically illustrated. A concave spherical mirror 107 similar to mirror 105 is mounted opposite the pupil opening 99 in the plate 101, and focuses radiation entering the housing 87 through aperture 99 of that optical system upon one of a row of photoconductive cells 1 arranged in a convex, arcuate row upon a preamplifier housing 108, in the same manner as explained in connection with FIG. 3. In this optical system, however, the chopper 30 (see FIG. 1 also) is added. This chopper 30 is rotatable in the housing on axis 110a and is driven by the synchronous motor 28 that also drives the 360 c.p.s. generator 29. It has a cylindrical shell 109 that passes between the mirror 107 and the row of cells 1, and this shell 109 has peripherally elongated openings 110 arranged in spaced relation to one another around the periphery of the shell 109, with imperforate portions of the shell 109 between the openings 110. The rotating cylinder thus intercepts the incidence of the radiation on the cells 1 with a regular frequency that creates an imposed signal frequency in the circuits of the cells 1. This periodic interrutpion of the radiation that reaches the photoconductive cells raises the frequencies of the signals from cells 1 to a frequency range where the detector works better.

Figure 5:
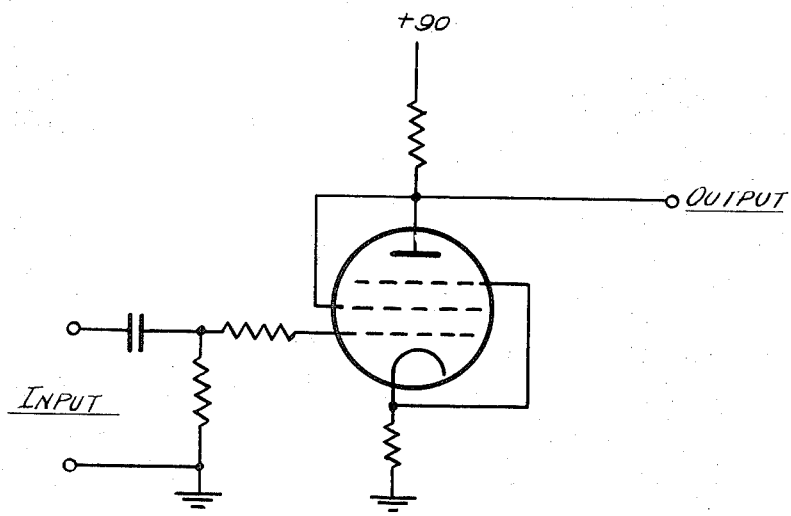
FIG. 5 is a circuit diagram illustrating one example of an electronic preamplifying means for the bolometer cell circuits that may be employed in the detector.

A suitable and satisfactory preamplifier circuit for the bolometer circuit is illustrated by way of example in FIG. 5. The bolometer cell has a resistance of about one megohm and a noise level not appreciably greater than the Johnson noise corresponding to its resistance. The signal frequencies in the output of such cells lie in the range of 0.5 to 2 c.p.s. To obtain all of the intrinsic detectivity of the detector, it is essential that the amplifier have a noise level that is small compared with that of the detector cell. The fundamental difficulty is the noise in vacuum tubes called "flicker noise" which becomes more and more prominent as the frequency is reduced. This was overcome by the circuit shown in FIG. 5 employing a suitably aged, triode-connected 6AU6 vacuum tube. The noise level of this amplifier at one c.p.s. is only slightly above that of a one megohm resistor in the grid circuit. In this circuit, the bias is obtained by the cathode resistor which is not bypassed. It is essential that no grid current flow, and there was no attenuation of the signal fed to the grid through a 10 megohm resistor. A 10,000 ohm resistor is connected in series with the grid and placed close to the grid physically.

Figure 6:
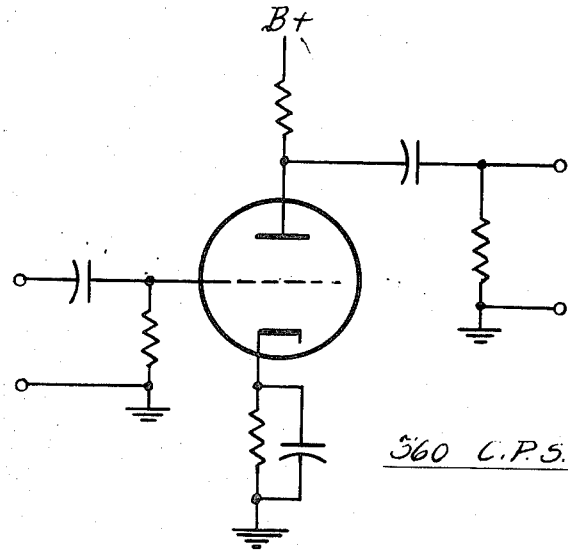
FIG. 6 is a circuit diagram illustrating one example of an electronic preamplifying means for the photoconductive cell circuits.

A suitable preamplifier circuit for the signal currents from the photoconductive cells is illustrated in FIG. 6. These preamplifiers 11 operate in a narrow frequency band centered at 360 c.p.s. where the flicker noise is negligible, and because the noise level of the PbS cell is substantially above the Johnson noise corresponding to its 2 megohm resistance, the design of this preamplifier offered little difficulty. The twin triode 12AY7 vacuum tube (only one-half being shown in FIG. 6) was quite satisfactory and permits two cells to be amplified with a single tube, which is an important factor because of the restricted space available for the preamplifiers.

Figure 7:
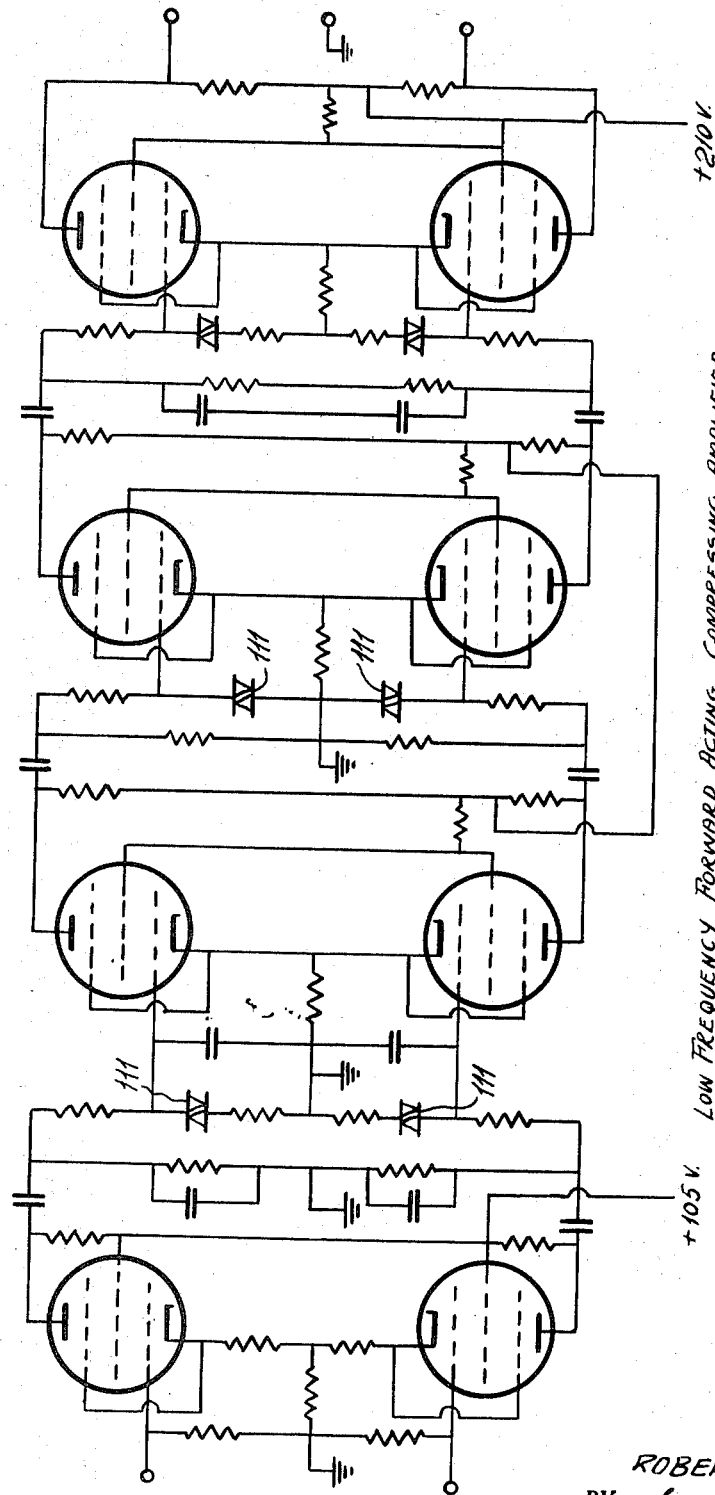
FIG. 7 is a circuit diagram illustrating one example of a low frequency, forward acting, compressing amplifier that may be used to further amplify the preamplified currents from each of the bolometer cells.

A suitable circuit arrangement for each of the low frequency, forward acting, compressing amplifiers for the bolometer cells is illustrated in FIG. 7. It employs simple, nonlinear interstage networks. The nonlinear element selected is a Western Electric Co. D162426 "varistor" 111 which has a back resistance at one volt of 10 megohms and a forward resistance at one volt of 500 ohms. Over a 10,000 to 1 ratio of current in the forward direction, the voltage varies as the 0.2 power of the current. The varistors 111 have their elements in pairs, with those in each pair reversed relatively to one another, and they make the otherwise standard compressing amplifier forward acting. The pushpull final amplification eliminates the use of large bypass condensers, and the "varistors" are used in pairs.

Figure 8:
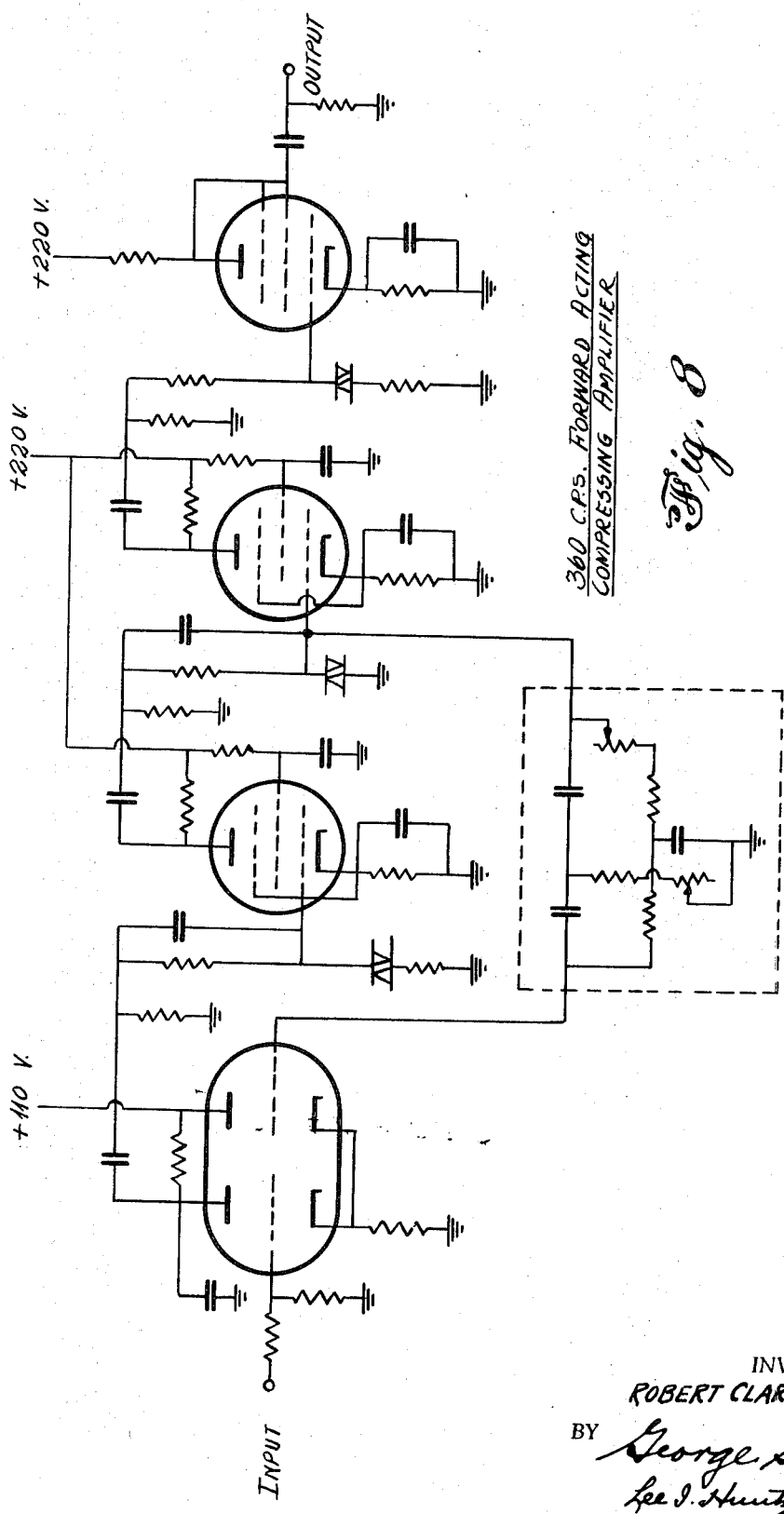
FIG. 8 is a circuit diagram illustrating one example of a forward acting, compressing amplifier for a frequency range of about 360 cycles per second (c.p.s.) that may be used to further amplify the preamplified currents from each of the photoconductive cells.

A suitable circuit arrangement for the 360 c.p.s. forward acting compressing amplifier used for further amplifying the signal currents from the photoconductive cells 1 is illustrated in FIG. 8. The pass-band of this amplifier should be centered at 360 c.p.s. and have a width of about 4 c.p.s. measured between the two frequencies at which the gain is less by 3 db than the peak gain. An important consideration about the pass-band is that all of the selectivity must be present before the signal reaches the last compressing network, otherwise noise components outside of the desired band will be modulated into the desired band by the nonlinear compressing elements. The desired selectivity was obtained by inserting a twin-T negative feedback element around the first two stages of the amplifier. This network permits the full gain of about 50 db to be obtained at the null of the twin-T network, but reduces the gain to unity at frequencies far removed from the null frequency of 360 c.p.s.

The feedback loop containing the twin-T element contains two of the three compressing networks, since the sharpness of the selectivity is proportional to the gain around this loop. For inputs more than about 20 db above the noise level the selectivity begins to decrease, and at the maximum input of 120 db above noise the gain is substantially flat from 50 c.p.s. to 2,000 c.p.s. This widening of the band-width for inputs substantially above noise is very desirable because the recovery from transients is fast for wide bandwidths. Thus the band is narrow hen it must be to afford a high detectivity, but is wide when the noise is unimportant. The circuit for this compressing amplifier is not push-pull because bypassing of screens and cathodes and feedback through the power supplies are not difficult problems at 360 c.p.s. Because the twin-T elements must be loaded at its output with a very high impedance, the output is fed to the cathode of the input tube through a cathode follower. Small condensers were placed across the series resistors of the compressing networks, since otherwise the internal shunt capacity of the "varistor" elements caused instability of the feedback loop.

In any system involving chopped radiation there is an unavoidable loss in the detectivity because half of the radiation is discarded or unutilized. There is another loss in detectivity which is caused by the necessity of doubling the bandwidth so that both side-bands of the modulated carrier may come through. This loss, however, may be recovered by using the fact that one knows the phase of the expected signal. The means used to recover this loss is the synchronous rectifier 25, through which the amplified signals from the photoconductive cells 1 are passed. Every linear rectifier provides the noise reduction of the synchronous rectifier when the signal is large compared with the noise. In this case one-half of the noise may be considered as modulating the amplitude of the signal carrier, and the other half of the noise, which is in phase quadrature with the first half, may be considered as modulating the phase of the signal carrier. Since the rectifier does not respond to the phase modulation, the second half of the noise makes no contribution in the output of the rectifier. This elimination of half of the noise by an ordinary linear rectifier does not occur, however, when the noise and signal are of comparable magnitude, and it is in just this situation that noise reduction is desirable. The half of the noise which is in quadrature with the signal carier can be eliminated at all signal levels by a synchronous rectifier, provided that the phase of the rectifier is properly related to the phase of the signal.

Figure 9:
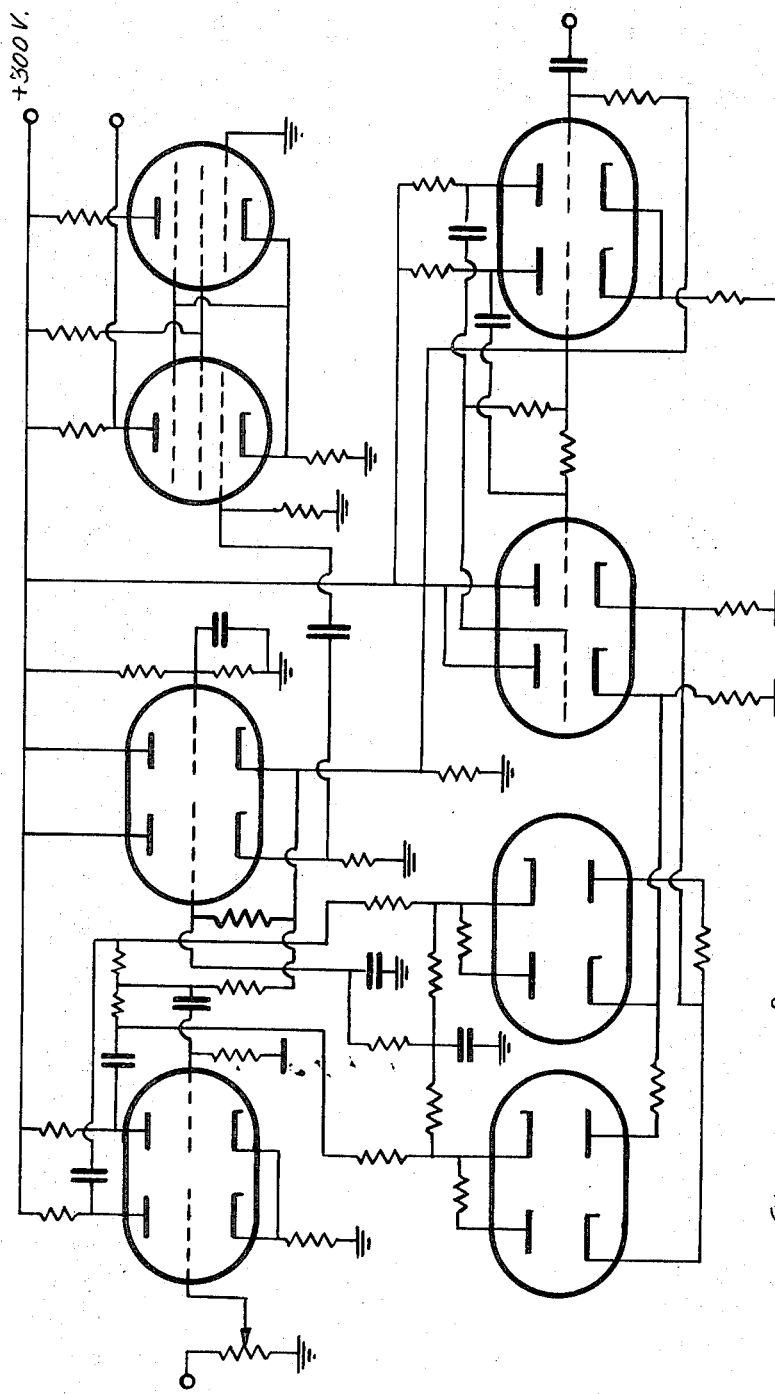
FIG. 9 is a circuit diagram illustrating one example of a synchronous rectifier that may be employed to rectify the compressively amplified currents from the photoconductive cells.

The signal which provides a reference phase for the synchronous rectifier is produced by the 360 c.p.s. electromagnetic generator 29 whose motor 28 is mounted rigidly on the shaft which operates the chopper 30. A suitable circuit of the synchronous rectifier is illustrated in FIG. 9 in which the rectification proper is accomplished by the four diodes at the lower left of the figure. The relative complexity of the circuit and the use of paired elements throughout are brought about by the necessity of preserving proper D.C. voltages and by the use of full-wave rectification. The signal from the compressing amplifier 17 is introduced at the upper left part of the circuit as illustrated, and the rectified output leaves the circuit at the upper right. The 360 c.p.s. carrier of reference phase is introduced at the lower right of the circuit as illustrated.

Since the phase shift of the 360 c.p.s. compressing amplifier is not exactly predictable, and the phase of the carrier from the 360 c.p.s. generator is not known, it is necessary to make a provision for adjusting the phase of the 360 c.p.s. reference carrier. Because the phase of the chopper is different from each of the PbS or photoconductive cells, this adjustment must be made separately for the channel of each photoconductive cell 1. This function is accomplished by the phase shifting circuit illustrated in FIG. 10. Phase shifting circuits are well known, but that illustrated is suitable for this purpose to combine the wave of the generator with the signal waves because they must be in phase.

Figure 10:
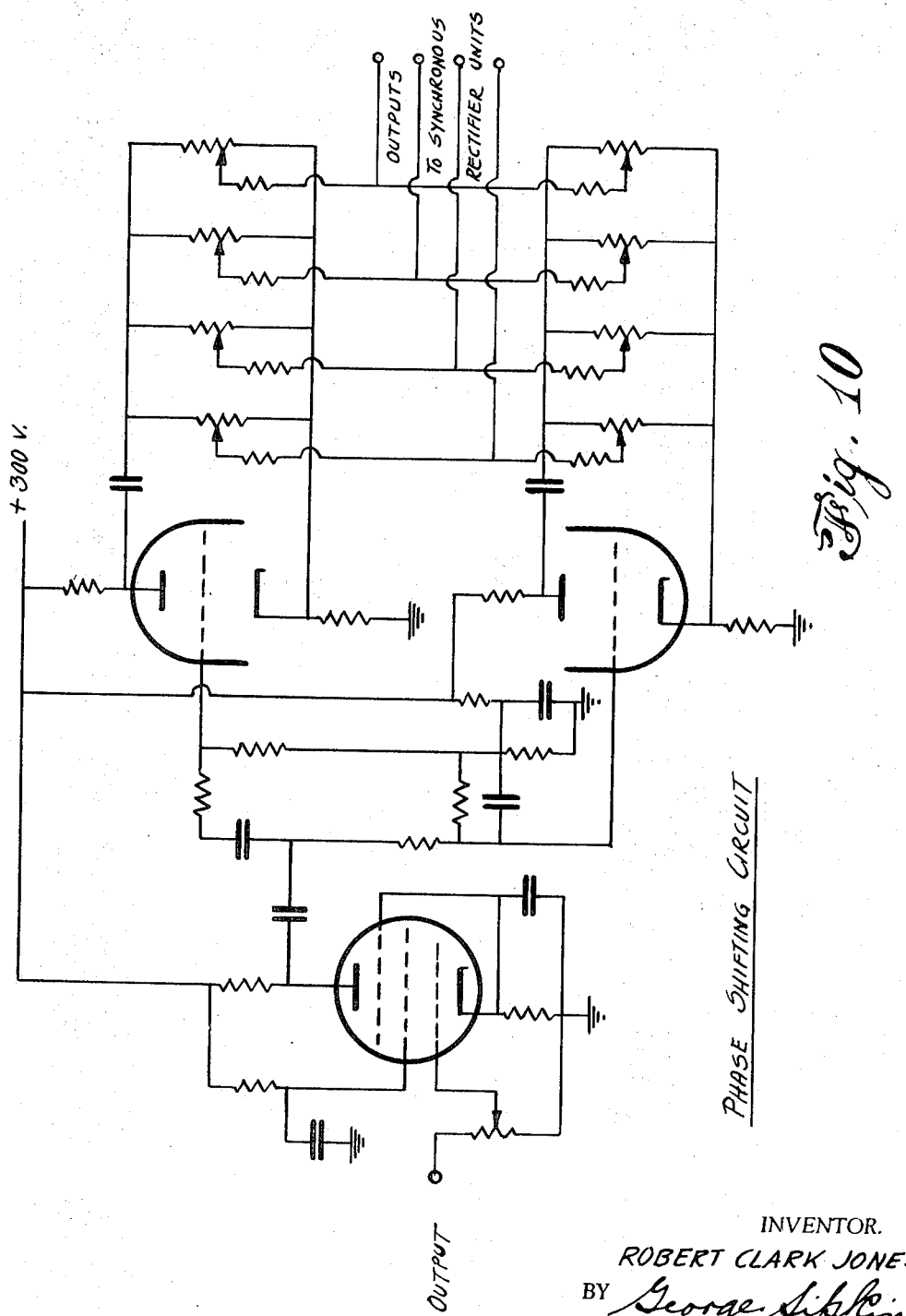
FIG. 10 is a circuit diagram illustrating one example of a phase shifting circuit that may be employed with the synchronous rectifiers for the currents from the photoconductive cells.

In the circuit as illustrated in FIG. 10, the carrier signal from the generator 29 (FIG.1) is amplified by the pentode tube on the left in the circuit diagram. The coupling networks between the pentode tube and the two triode tubes have the function of advancing the phase 45° for the upper triode tube, and retarding the phase 45° for the lower triode tube, so that the signals reaching the grids of the two triode tubes will be 90° apart. The two plates and the two cathodes of the triode tubes therefore supply four carriers of equal amplitude and with phases such that if any one of these four carriers is assigned arbitrarily a zero phase angle, then the other three carriers have the phases 90°, 180°, and 270°. By a suitable linear combination of these four carriers, it is possible to obtain a 360 c.p.s. carrier of any desired phase The mixture of the carriers is accomplished by manual adjustment of the eight potentiometers, two for each of the synchronous rectifiers. The four outputs are indicated at the right of the circuit diagram.

The four signals from the four synchronous rectifiers are to appear on the face of the cathode ray tube as brightness modulation of four concentric circles, one circle for each of the four detectors. In order to be able to present the four circles simultaneously without employing a four-gun cathode ray tube, the four signals are connected sequentially and repetitively to the cathode ray tube in synchronism with the radial scan of the spot. This radial scan is repeated approximately ten times a second, so that each of the four circles is given information ten times per second. This sequential and repetitive presentation of the four signals for the four synchronous rectifiers is accomplished by the motor driven rotary switch 41. In the case of the low frequency channels from the bolometer cells 2, the signals from their compressing amplifiers 57 pass directly to the contacts 70 of the rotary switch 71. The circuit connections to the switches 41 and 71 are illustrated in FIGS. 12 and 13.

In switch 41, shown in FIG. 13, the rotary switch arm 42 makes contact sequentially with the contacts 40, but interposed between the contacts 40 are additional contacts 112 and 113 as shown, to be engaged by the rotary arm 42 in its rotation. Each contact 112 is connected to ground through a resistor 114 such as of 0.5 megohm, and each contact 113 is connected through a similar resistor 115 to a source of relatively high potential such as +300 volts. The contacts 112 and 113 are arranged in alternate sequence between the contacts 40, a contact 113 being arranged between the contacts for channels #1 and #2, and a contact 112 being arranged between the channels #2 and #3, except that between the contacts for channels #4 and #1 there are in sequence a contact 112, then a contact 113, and then another contact 112.

In switch 71, contacts 116 and 117 are similarly disposed alternately and in sequence in the path of rotation of the arm 72 to be engaged by the arm 72 while it is moving between the channel contacts 70, except that between channels #4 and #1 there are first a contact 117, then a contact 116 formed of two contact areas 118 spaced apart in the direction of rotation of the switch arm 72, and then another contact 117. Between the spaced contact areas 118 is another small contact 80 (see FIG. 1 also) which is connected by wire 81 to the presentation circuit unit 82.

The switch arm 42 thus, between its contacts with the channel contacts, alternately connects the full wave rectifier 47 to a positive high voltage of say 300 volts and to ground through a resistor 114. Similarly the switch arm 72 makes contact, between its connections to the four channel contacts, alternately with a positive high voltage of about 210 volts and a ground through a resistor, except that between contacts 70 for channels #4 and #1, the switch arm 72 completes a circuit to the full wave rectifier 74, in succession, from a grounded contact 117 a positive potential of 210 volts, then the contact 80, then again from said positive potential of 210 volts, and then from another grounded contact 117.

The wire 81 leads to the presentation circuit illustrated in FIG. 14 where it is connected to terminal 119 of that circuit. When switch arm 72 engages with contact 80 in passing, it activates the presentation circuit which will be described later herein.

Figure 11:
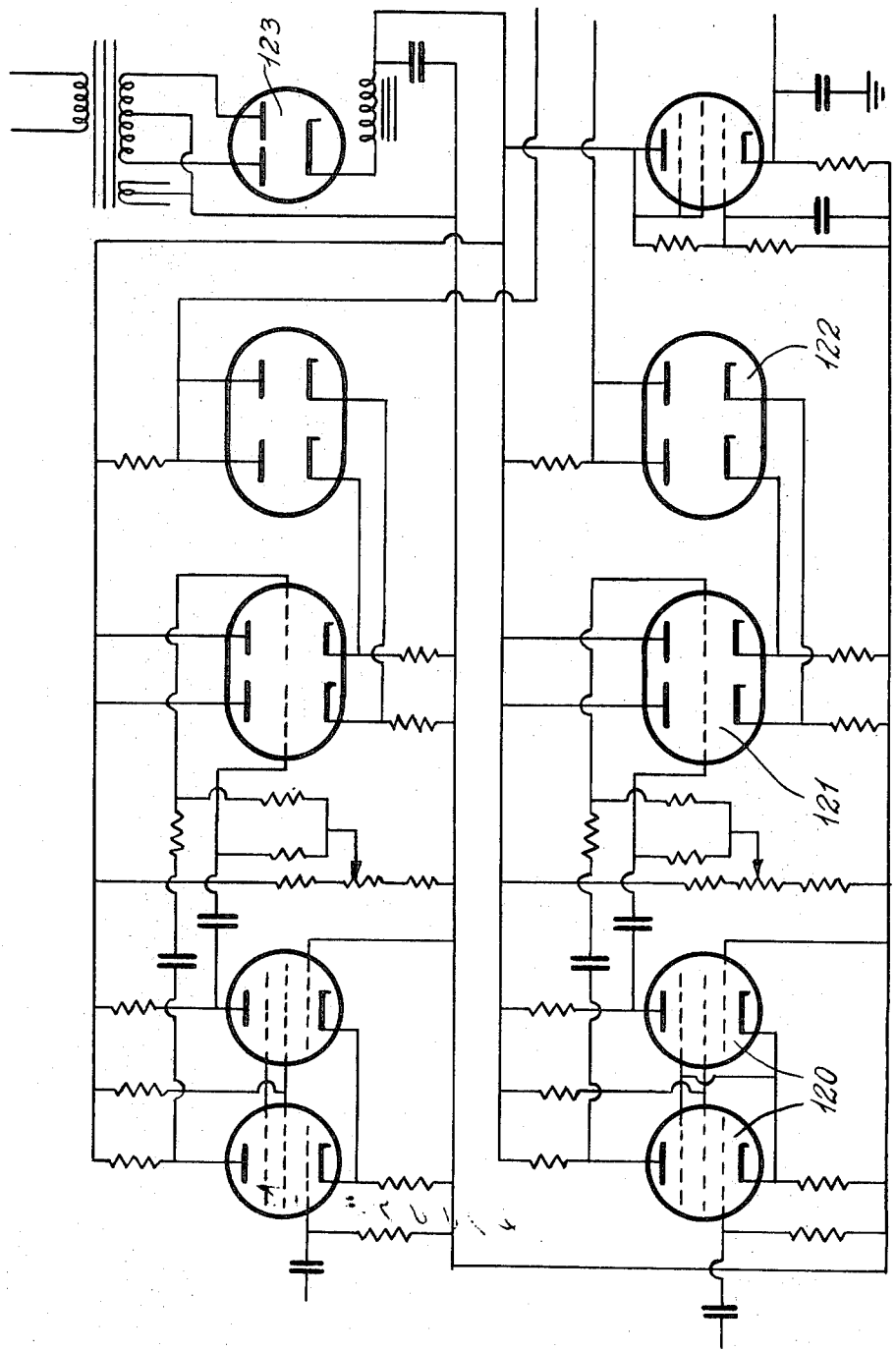
FIG. 11 is a circuit diagram illustrating one example of a full wave rectifier that may be employed in connection with the currents from the photoconductive cells and also with those from the bolometer cells.

The two multiplexed signals from the rotary switches, one from the bolometer system and the other from the photo-conductive cell system, are now nearly ready to be supplied to the two brightness control grids of the two cathode ray tubes. The signals, however, still contain a variation in the sign of the signal, the sign depending on whether the target is hot or cold. This variation is removed by the full wave rectifiers 47 and 49 which are shown assembled side by side in FIG. 11. The following remarks apply to either of the rectifiers. In FIG. 11 the two pentode tubes 120 provide two outputs, one of which is the inverse of the other. These two signals are then reduced in impedance by a pair of cathode followers 121 in one enclosure, and the double diode tube 122 then selects as the output that one of the two signals which is higher in potential. This output signal is carried directly to the brightness-control grid. The tube 123 in the circuit and its connections provide a conventional power supply for the tubes of both of these rectifiers.

The D.C. level of the signals fed into the rotary switches is not the same as the D.C. level of the signals from the rotary switch, because each switch introduces also other voltages as explained and illustrated in connection with FIGS. 12 and 13. Accordingly the D.C. level for each full wave rectifier must be set by manual adjustment to accord with the D.C. level of the original signals. This is the function of the variable adjustment shown both above and below in FIG. 11. The entire circuit shown in FIG. 11 operates at about 1500 volts above ground, because for safety reasons the positive screen of the cathode ray tube is grounded, so that the cathode and the brightness-control grid of the electron gun operate about 1500 volts below ground. The exact voltage of the ground of the circuit is determined by the cathode follower at the lower right-hand corner of FIG. 11.

The presentation circuit above referred to and illustrated in FIG. 14, provides the variable voltages which control the instantaneous position of the cathode ray spot. Only one circuit for both cathode ray tubes is provided, which operates in parallel the deflector plates of both cathode ray tubes. The presentation system may be regarded as having two separate tasks. First, it must provide the radial sawtooth scan which, by oscillating in synchronism with the multiplexing of the signals, serves to place the four signals at four different radii of the screen of the related cathode ray tube. Second, it must move the spot tangentially in synchronism in azimuthal rotation of the optical systems. The radial scan is rapid, approximately ten scans per second, whereas the tangential motion is relatively slow, such as one full rotation in 15 seconds.

The presentation circuit illustrated in FIG. 11 operates as follows: The pulse obtained once per rotation of the rotary switch arm 73, by its contact with contact 80, triggers the single-shot multivibrator 124 illustrated in the lower left corner of the diagram. The sawtooth output of this multivibrator is rendered push-pull by the inverter 125 at the upper left of the circuit diagram, and is combined with a push-pull D.C. voltage on the grids of the two cathode followers 126 at the top center of the circuit diagram. The D.C. voltage sets the mean radius of the four circles on the tube screens, and the amplitude of the sawtooth voltage sets the difference of the radii. Both are adjustable. The output of the cathode followers is applied across the 16,000 ohm resistance card of a sine and cosine generator 85. This generator is mounted on the pedestal of the scanning system and rotated in synchronism with the azimuthal rotation of the optical systems, as explained earlier herein. The two outputs of the sine and cosine generator supply the input voltage multiplied respectively by the sine and the cosine of the azimuthal angle. These outputs are precisely the voltages desired for the two pairs, respectively, of the deflector plates of each of the cathode ray tubes. The two outputs are amplified by the two-push-pull amplifiers 129 and 130 at the upper and lower right ends of the circuit diagram of FIG. 11. The output of these amplifiers is connected directly to the deflector plates. The signals from the detector cells do not enter the presentation circuit, since these signals do not adjust the position of the spot but only determine its brightness.

The use of both photoconductive cells and bolometers with a separate optical system for each gives maximum accuracy in detection of spectrum radiation, because they do not have the same sensitivity to radiation in the same bands of radiation. For example, the photoconductive lead cells have their maximum effectivness and sensitivity to radiation from sources of higher temperature than bolometers, and the latter have maximum effectiveness and sensitivity to radiation from sources having temperatures much lower than those at which the photoconductive cells are most effective. The photoconductive cells are less sensitive than bolometer cells to background fluctuations, clouds or local objects. The bolometer cells provide a more comprehensive detector than the photoconductive cells, in that in a large variation in types of aircraft at a moderate distance, a bolometer will detect a larger fraction than will a photoconductive cell. With a bolometer, no mechanical chopper is required, and it need not be cooled. By using both types of cells, there is greater certainty of detection of a distance object emitting spectrum radiation, and it would be impractical to operate separate detectors using different types of cells or to change the types of cells during use of the detector. While this hemispheric detector is particularly useful in the detection of airborne, power operated bodies, it also may be used in the detection of surface craft and bodies that emit spectrum radiation.

Preferably, for best results, eighteen cells are provided along a 90° arc in one optical system, and eighteen cells 2 are provided along a 90° arc in the other optical system, which gives a resolution element of 5° in elevation and one or two degrees in azimuth. It is possible, however, to use as little as four of the cells 1 or 2 on a 90° arc in each optical system, on a preamplifier housing, arranged in spaced relation end to end, but such a detector covers only a 20° range of elevation angle (5 degrees for each of the four detector cells in an optical system). Since that arrangement of only four cells on a 90° arc does not cover the entire hemisphere, provision is made for a manual adjustment or tilting of the housing to adjust the elevation angle of the two optical systems. In the drawings and description only four cells 1 or 2 have been shown and referred to for each optical system, in order to simplify an explanation of the principle of the invention, but it should be understood that a considerably greater number of cells for each optical system are advantageously used for best results, preferably eighteen cells for each optical system.

Figure 15:
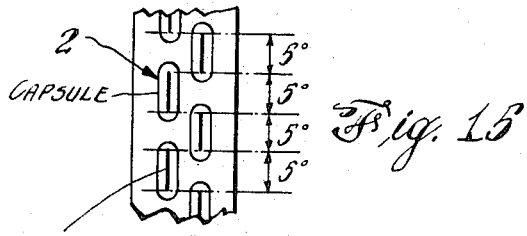
FIG. 15 is a schematic face view of the cell arrangement.

Each of the detecting elements (bolometer or lead sulfide cell) is individually placed in a sealed capsule. The geometrical limitation of the capsule has the result that the length of the capsule is nearly twice the length of the detecting element. Therefore, if the capsules were arranged end to end along the arc, there would be gaps in the range of elevation angles that could be scanned. To avoid these gaps, the cells are arranged in two staggered rows as shown in FIG. 15 for the eighteen cell arrangement. With the staggered arrangement, there are no gaps in the range of elevation angle that is covered.

In practice, it is desirable to make the range of elevation angle covered by each of the detectors overlap slightly the ranges covered by the two adjacent detectors. This avoids the possibility that a week target might be missed if it fell on the boundary between two adjacent ranges of elevation angle.

It is well known to those versed in the art that with bolometer detectors, the response time constant of the detector should be matched to the time of dwell of the target radiation on the cell. Therefore, if the time of dwell is short enough to lie in the range of time constants accessible with bolometers, chopping of the radiation is not desirable. On the other hand, the lead sulfide cells have their best detecting ability at a frequency that is large compared with the reciprocal time of dwell of the radiation signal. Accordingly it is desirable to chop the radiation falling on the lead sulfide cell so that the radiation signal has frequency components at the frequency of optimum detecting ability.

It will be understood that various changes in the details, materials, and arrangements of parts which have been herein described and illustrated in order to explain the nature of the invention, may be made by those skilled in the art, within the principle and scope of the invention as expressed in the appended claims.

I claim:
1. A hemispheric search detector for a body emitting spectrum radiation, which comprises a hemispheric scanning device rotatable about an upright axis and focusing spectrum radiation received from any source during such rotation upon one of a plurality of cells whose conductivity varies in accordance with the radiation incident thereon and arranged in succession in a row, the particular cell on which the radiation is focused depending upon the inclination of the radiation received, circuit means for passing an electric current through each of said cells for modification by the conductivity of that cell, means for amplifying the current through each cell, a full wave rectifier, switch means for passing said amplified currents from said circuit means in succession and repetitively through said full wave rectifier, a cathode ray picture tube having a viewing screen, an electron beam deflector means and a brightness electrode, means electrically connecting the output of said rectifier to the brightness electrode of said tube, and presentation means connected to said switch means and providing a saw tooth scan signal that places the modified signals from the cells in different radii of the screen of said tube and controls said beam deflector means of said tube.

2. A hemispheric search detector for a body emitting spectrum radiation, which comprises a hemispheric scanning device rotatable about an upright axis and focusing spectrum radiation received from any source during such rotation upon one of a plurality of cells whose conductivity varies in accordance with the radiation incident thereon and arranged in succession in a row, the particular cell on which the radiation is focused depending upon the inclination of the radiation received, circuit means for passing an electric current through each of said cells for modification by the conductivity of that cell, means for amplifying the current through each cell, a full wave rectifier, switch means for passing said amplified currents from said circuit means in succession and repetitively through said full wave rectifier, a cathode ray picture tube having a viewing screen, an electron beam deflector means and a brightness electrode, means electrically connecting the output of said rectifier to the brightness electrode of said tube, and means controlled by said switch means for representing pictorially the signals from the cells in different radii of the screen of said tube and controlling the deflector means of said tube.

3. A hemispheric search detector for a body emitting spectrum radiation which comprises a hemispheric scanning device rotatable about an upright axis and focusing upon one of a plurality of cells, whose conductivity varies in accordance with the spectrum rays incident thereon, any spectrum radiation received from any source during such rotation, said cells being arranged in a row along successive focii positions for such radiation, the particular cell on which such radiation is focused depending upon the inclination of the spectrum radiation received and being focused, a circuit for each of said cells, means in each of said circuits for amplifying the currents therein, full wave rectifier means, a cathode ray picture tube having a viewing screen, electron beam deflector means and a brightness electrode, switch means for connecting said cell circuits repetitively and in succession to said rectifier, means connecting said rectifier means to said brightness electrode, and means connected to said switch means and to said beam deflector means for placing the signals from the amplified currents of said cells in succession each in a different radii of said screen of said tube and also for controlling the activity of said beam reflector means.

4. The detector as set forth in claim 3, wherein said means connected to the switch means and the beam deflector means provides a saw tooth scanning signal that places the modified signals from the cells in the different radii of the screen of the tube.

5. A hemispheric search detector for a body emitting spectrum radiation, which comprises a hemispheric scanning device rotatable about an upright axis, having a plurality of radiation sensitive detector cells arranged in succession along a concavely arcuate vertical row and also means to focus radiation received from any source during such rotation, upon one of said detector cells, an individual electric circuit for and controlled by each cell, the particular cell on which the radiation is focused depending upon the inclination of the incident radiation received, means for amplifying any currents in each individual cell circuit, means for compressively amplifying the amplified currents from each detector circuit, a cathode ray picture tube having a brightness modulation control and scanning means, and circuit means for successively and repetitively applying said compressively amplified currents to said brightness modulation control and scanning means of said picture tube, whereby the varying brightness of the picture in said tube during rotation of said scanning device indicates the azimuth of the source of such brightness when a maximum, even at different elevations of said source.

6. A hemispheric search detector for a body emitting spectrum radiation, which comprises a hemispheric scanning device rotatable about an upright axis, having a plurality of radiation sensitive detector cells arranged in succession in a row and also means to focus radiation received from any source during such rotation, upon one of said detector cells, an individual electric circuit for and controlled by each cell, the particular cell on which the radiation is focused depending upon the inclination of the radiation received, means for amplifying any currents in each individual cell circuit, means for compressively amplifying the amplified currents from each detector circuit, a cathode ray picture tube having a brightness modulation control and scanning means, and circuit means for successively and repetitively applying said compressively amplified currents to said brightness modulation control and scanning means of said picture tube, said means for applying the compressively amplified currents including a rotary switch that transmits said compressively amplified currents in succession and repetitively to said brightness modulation control and scanning means of said picture tube.

7. A hemispheric search detector for a body emitting spectrum radiation, which comprises a hemispheric scanning device rotatable about an upright axis, having a plurality of radiation sensitive detector cells arranged in succession in a row and also means to focus radiation received from any source during such rotation, upon one of said detector cells, an individual electric circuit for and controlled by each cell, the particular cell on which the radiation is focused depending upon the inclination of the radiation received, means for amplifying any currents in each individual cell circuit, means for compressively amplifying the amplified currents from each detector circuit, a cathode ray picture tube having a brightness modulation control and scanning means, and circuit means for successively and repetitively applying said compressively amplified currents to said brightness modulation control and scanning means of said picture tube, said means for applying the currents to the brightness modulation control of said tube including a full wave rectifier through which said currents pass to said brightness modulation control.

8. The search detector as set forth in claim 6, wherein said circuit means for applying the currents to the brightness control includes a full wave rectifier through which said currents pass from said rotary switch to said brightness modulation control.

9. A hemispheric search detector for a body emitting spectrum radiation, which comprises a hemispheric scanning device rotatable about an upright axis, having a plurality of photoconductive detector cells arranged in succession in a row, and also having means to focus spectrum radiation received from any source during such rotation upon that one of said cells depending upon the angle of inclination of the radiation from such source, means for periodically interrupting the incidence of any focused radiation on each cell, an individual electric circuit for and controlled by each cell, means for amplifying the currents in each individual circuit, means for individually receiving such amplified currents of each circuit and compressively amplifying them, an individual synchronous rectifier connected to receive and pass the compressively amplified currents from each cell circuit, and operable to change the currents to those which would exist, except for the compression in the amplification, if no periodic interruption had occurred, means associated with each of said rectifiers for shifting the phase of the rectified currents, a full wave rectifier, means for passing the currents from each of said synchronous rectifiers successively and repetitively through said full wave rectifier, a cathode ray picture tube having a brightness modulation control and scanning means, a circuit connection from said full wave rectifier to said modulation control, and means controlling said scanning means of said tube.

10. The detector as set forth in claim 9, wherein said means for controlling said tube scanning means includes a sine cosine generator.

11. A hemispheric search detector for a body emitting spectrum radiation, which comprises a housing, means for rotating said housing about an upright axis, a group of photoconductive cells arranged in a row in said housing, a group of bolometer cells arranged in another row in said housing, a separate optical system in said housing for each group of cells to concentrate any and each operable received spectrum radiation upon one of the cells of that related group depending on the angle of incidence of the received radiation, means for passing an individual current through each of the cells of each group for modification thereby, means for individually amplifying the currents passing through each cell, a pair of cathode ray picture tubes, one for each group of cells, and means controlled by the amplified currents from the cells of each group for pictorially comparing the currents of each group on the related picture tube for that group, whereby the azimuth and elevation of the received spectrum radiation will be indicated over a maximum range of temperatures of the radiation emitting body which is detected.

12. The detector as set forth in claim 11, wherein each picture tube has a brightness modulation control, and the means controlled by the amplified currents includes a full wave rectifier for the amplified currents of each group of cells controlling the brightness modulation control of the picture tube for that group.

13. The detector as set forth in claim 11, including means for compressively amplifying individually the amplified currents from the photoconductive cells, an individual synchonous rectifier for rectifying the compressively amplified currents from each photoconductive cell, a full wave rectifier for each group of cells and connected to the brightness modulation control of its related picture tube, switch means for passing the amplified currents from the bolometer cells in succession and repetitively through the related full wave rectifier, and switch means for passing the amplified and synchronously rectified currents from the photoconductive cells in succession and repetitvely through the full wave rectifier.

14. The detector as set forth in claim 11, having a brightness control for each picture tube, means for repetitively interrupting the concentration of the spectrum radiation on the photoconductive cells at a regulated frequency, means for compressively amplifying individually the amplified currents from each cell, means for individually and synchronously rectifying the compressively amplified currents from the photoconductive cells and shifting their phase, a full wave rectifier for each group of cells and connected to the brightness control of its related picture tube, switch means operable to pass the rectified and phase-shifted currents from the photoconductive cells in succession and repetitively to its related full wave rectifier, and another switch means operable to pass the compressively amplified currents from the bolometer cells through in succession and repetitively to its related full wave rectifier.

15. The detector as set forth in claim 14, and a sine cosine generator in said means controlled by the amplified currents from the photoconductive cells for regulating the scanning positions on the picture tube by which those amplified currents from the photoconductive cells are compared.

16. The detector as set forth in claim 9, wherein said phase shifting means includes a current generator having a predetermined frequency, and a phase shifter supplied with current from said generator.

17. A hemispheric search detector for a body emitting spectrum radiations, which comprises a hemispheric scanning device rotatable about an upright axis, having a plurality of radiation responsive cells arranged in a concavely arcuate, vertical row and whose conductivity varies with the spectrum radiation thereon, and also means for focusing said spectrum radiation received from any source during such rotation of said device upon one of said cells in the row, which one cell is dependent upon the angle of incidence of the received radiation, an individual circuit for each cell, means for passing a current through each circuit for individual modification by the conductivity of the cell of that circuit, means for individually amplifying the currents in said circuits, a cathode ray picture tube having a screen, scanning means, a brightness modulation control means, and means for comparing the idividually amplified currents on said screen by passing the amplified currents in succession and repetitively to the brightness modulation control means of the picture tube, and representing each individual circuit in a different radial zone on said screen, whereby the varying brightness of the picture in said tube during rotation of said scanning device indicates the azimuth of the source of such brightness when a maximum, even at different elevations of said source.

18. A hemispheric search detector for a body emitting spectrum radiation, which comprises a housing, means for rotating said housing about an upright axis, two groups of cells in said housing, those of one group being photoconductive and those of the other group being bolometers, a separate optical system for each group of cells carried by said housing and each system operable throughout rotation of said housing to concentrate on a cell of its related group depending upon the vertical angle of incidence on that system of the received radiation, means for passing an electric current through each cell individually, a pair of cathode ray picture tubes, one for each system and each having a screen, and means for pictorially representing comparatively on the screen of each tube, under the control of the individual circuits, the relative intensities of radiation received from different sources by that related optical system and the elevations of the sources of the received radiations, and the relative azimuths of such sources, whereby the detector will have maximum ability to detect sources of such radiation having a maximum possible range of temperatures.

References Cited

UNITED STATES PATENTS 2,403,066   7/1946   Evans _____ 250—83.3

RICHARD A. FARLEY, Primary Examiner

U.S. Cl. X.R.

356—141